(12) United States Patent
Hwang et al.

(10) Patent No.: US 11,007,917 B2
(45) Date of Patent: May 18, 2021

(54) METHOD FOR MANUFACTURING SOUND INSULATION MATERIAL, SOUND INSULATION MATERIAL MANUFACTURED USING THE METHOD AND CARPET FOR VEHICLE USING THE SAME

(71) Applicants: HANWHA COMPOUND CORPORATION, Jeollanam-do (KR); HANMIN AUTOMOTIVE TRIM INDUSTRY CO., LTD., Chungcheongbuk-do (KR); HYOSUNG ADVANCED MATERIALS CORPORATION, Seoul (KR)

(72) Inventors: Jin-Ho Hwang, Seoul (KR); Jin-Hyung Lee, Gyeonggi-do (KR); Chang-Mo Seong, Gyeonggi-do (KR); Sang-Rae Song, Gyeonggi-do (KR); Won-Jin Seo, Gyeonggi-do (KR); Won-Sik Choo, Seoul (KR); Jong-Min Kim, Seoul (KR); Young-Hwan Yoon, Daejeon (KR); Jong-Sung Park, Incheon (KR); Jung-Hoon Park, Incheon (KR); Byoung-Chul Park, Daejeon (KR); Eun-Kyung Lee, Seoul (KR)

(73) Assignees: Hanwha Compound Corporation, Jeollanam-do (KR); Hanmin Automotive Trim Industry Co., Ltd., Chungcheongbuk-do (KR); Hyosung Advanced Materials Corporation, Seoul (KR)

(*) Notice: Subject to any disclaimer, the term of this patent is extended or adjusted under 35 U.S.C. 154(b) by 476 days.

(21) Appl. No.: 15/472,780

(22) Filed: Mar. 29, 2017

(65) Prior Publication Data
US 2018/0001810 A1 Jan. 4, 2018

(30) Foreign Application Priority Data

Jun. 30, 2016 (KR) .................. 10-2016-0082223

(51) Int. Cl.
*B29C 48/00* (2019.01)
*B60N 3/04* (2006.01)
(Continued)

(52) U.S. Cl.
CPC ............ *B60N 3/048* (2013.01); *B29C 48/022* (2019.02); *B29C 48/154* (2019.02); *B60N 3/042* (2013.01);
(Continued)

(58) Field of Classification Search
CPC .................................................. B29C 48/022
See application file for complete search history.

(56) References Cited

FOREIGN PATENT DOCUMENTS

| KR | 10-2004-0000118 A | 1/2004 |
| KR | 10-2006-0069558 A | 6/2006 |

(Continued)

OTHER PUBLICATIONS

KIPO, Notification for Reasons for Refusal, dated Oct. 2016 (Year: 2016).*

*Primary Examiner* — Ryan M Ochylski
(74) *Attorney, Agent, or Firm* — BakerHostetler

(57) ABSTRACT

Disclosed herein is a method for manufacturing a sound insulation material, a sound insulation material manufactured using this manufacturing method, and a carpet for a vehicle using the sound insulation material, and the sound insulation material is manufactured using a composite resin composition including 30 parts by weight to 70 parts by weight of aluminum oxide, 10 parts by weight to 20 parts by weight of nanoclay, 0.2 parts by weight to 0.8 parts by weight of an antioxidant, and 0.1 parts by weight to 0.5 parts
(Continued)

by weight of a lubricant, with respect to 100 parts by weight of a base resin including PE, and the carpet for a vehicle is manufactured by coating the sound insulation material on a carpet fabric material and drying the result.

9 Claims, 4 Drawing Sheets

(51) Int. Cl.
| | |
|---|---|
| *B29C 48/154* | (2019.01) |
| *B60R 13/08* | (2006.01) |
| *C08K 3/22* | (2006.01) |
| *C08K 3/30* | (2006.01) |
| *C08K 3/34* | (2006.01) |
| *C08L 23/06* | (2006.01) |
| *B29C 48/18* | (2019.01) |
| *B82Y 30/00* | (2011.01) |
| *B29L 31/30* | (2006.01) |
| *B29L 31/00* | (2006.01) |

(52) U.S. Cl.
CPC ............... *B60R 13/08* (2013.01); *C08K 3/22* (2013.01); *C08K 3/30* (2013.01); *C08K 3/34* (2013.01); *C08K 3/346* (2013.01); *C08L 23/06* (2013.01); *B29C 48/18* (2019.02); *B29L 2031/30* (2013.01); *B29L 2031/7322* (2013.01); *B82Y 30/00* (2013.01); *C08K 2003/2227* (2013.01); *C08K 2003/2275* (2013.01); *C08K 2003/3045* (2013.01); *C08K 2201/011* (2013.01)

(56) References Cited

FOREIGN PATENT DOCUMENTS

| KR | 10-2010-0021608 A | 2/2010 |
|---|---|---|
| KR | 10-2012-0139733 A | 12/2012 |

\* cited by examiner

METHOD FOR MANUFACTURING SOUND INSULATION MATERIAL, SOUND INSULATION MATERIAL MANUFACTURED USING THE METHOD AND CARPET FOR VEHICLE USING THE SAME

CROSS-REFERENCE(S) TO RELATED APPLICATIONS

This application claims priority to Korean Patent Application No. 10-2016-0082223, filed on Jun. 30, 2016, the disclosure of which is incorporated herein by reference in its entirety.

BACKGROUND OF THE INVENTION

Field of the Invention

Exemplary embodiments of the present invention relate to a method for manufacturing a sound insulation material, a sound insulation material manufactured using this manufacturing method, and a carpet for a vehicle including the sound insulation material, and in particular, to a method for manufacturing a sound insulation material capable of satisfying both excellent moldability and sound insulation performance, a sound insulation material manufactured using this manufacturing method, and a carpet for a vehicle including the sound insulation material.

Description of the Related Art

Generally, a carpet for an automobile is an interior material installed on a floor panel of an automobile interior and a floor of a trunk room, and maintains a silent interior atmosphere by blocking various noises, engine noise and the like generated during the operation of an automobile.

Such a carpet for an automobile has a structure in which a first layer for securing fabric moldability and a second layer for securing sound insulation performance are formed by being each coated on a fabric pile layer, and a sound absorbing material adheres to a bottom of the second layer. As the first layer, a polyethylene (PE) coating layer is normally used, and as the second layer, any one of an ethylene-vinyl acetate copolymer (EVA) coating layer, an acrylic polymer (AP) coating layer and an EVA/AP coating layer is used. Due to recent decline in the engine noise, improvements in the wind noise and the road noise are required, and in order to reduce the road noise, that is, road surface noise, improvements in the performance of a carpet for an automobile thereof have been continuously required, and as a result, the weight thereof has gradually increased.

Particularly, in existing technologies on carpets for an automobile, sound insulation materials of acrylic polymer (AP) and ethylene-vinyl acetate copolymer (EVA) are consecutively coated on a fabric for shielding external noises, and high weight sound insulation materials are mostly used, which leads to a problem of increasing a car body weight and thereby decreasing fuel efficiency.

In addition, existing carpets for an automobile have a problem in terms of a manufacturing process for molding two layers, a problem of cost increase caused by additional burden of material expenses, and in addition to these, a problem of declining workability caused by a coating process of a sound insulation material.

SUMMARY OF THE INVENTION

An object of the present invention is to provide a method for manufacturing a sound insulation material capable of enhancing noise and vibration (NVH) performance while reducing a weight, a sound insulation material manufactured using this manufacturing method, and a carpet for a vehicle using the sound insulation material.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In view of the above, a method for manufacturing a sound insulation material according to one embodiment of the present invention includes a resin composition preparation step preparing a composite resin composition further including 30 parts by weight to 70 parts by weight of aluminum oxide, 10 parts by weight to 20 parts by weight of nanoclay, 0.2 parts by weight to 0.8 parts by weight of an antioxidant and 0.1 parts by weight to 0.5 parts by weight of a lubricant, with respect to 100 parts by weight of a base resin including PE, and an extrusion molding step extrusion molding the composite resin composition prepared in the resin composition preparation step.

In the embodiment of the present invention, 100 parts by weight of the base resin may be a mixture of 60 parts by weight to 80 parts by weight of LDPE and 20 parts by weight to 40 parts by weight of rubber.

In the embodiment of the present invention, the resin composition preparation step may further include 4 parts by weight to 6 parts by weight of a high flowing modifier with respect to 100 parts by weight of the base resin to prepare the composite resin composition.

In the embodiment of the present invention, the resin composition preparation step may further include greater than 0 parts by weight and less than or equal to 70 parts by weight of barium sulfate with respect to 100 parts by weight of the base resin including PE to prepare the composite resin composition.

In the embodiment of the present invention, the resin composition preparation step may further include greater than 0 parts by weight and less than or equal to 40 parts by weight of talc with respect to 100 parts by weight of the base resin including PE to prepare the composite resin composition.

In the embodiment of the present invention, the resin composition preparation step may further include greater than 0 parts by weight and less than or equal to 25 parts by weight of wollastonite with respect to 100 parts by weight of the base resin including PE to prepare the composite resin composition.

In the embodiment of the present invention, the resin composition preparation step may further include 1 part by weight to 3 parts by weight of a pigment with respect to 100 parts by weight of the base resin including PE to prepare the composite resin composition.

In the embodiment of the present invention, the resin composition preparation step may include a first feeding process introducing 0.2 parts by weight to 0.8 parts by weight of an antioxidant and 0.1 parts by weight to 0.5 parts by weight of a lubricant in addition to 100 parts by weight of the base resin, that is, 60 parts by weight to 80 parts by weight of LDPE and 20 parts by weight to 40 parts by weight of rubber, to a first raw material feeding vessel on a fore-end side of a biaxial extruder heated to 150° C. to 240° C., and a second feeding process introducing 30 parts by weight to 70 parts by weight of aluminum oxide and 10 parts by weight to 20 parts by weight of nanoclay with respect to 100 parts by weight of the base resin to a second raw material feeding vessel located at the middle of the biaxial extruder after the first feeding process.

In the embodiment of the present invention, at least any one of 4 parts by weight to 6 parts by weight of a high flowing modifier and 1 part by weight to 3 parts by weight of a pigment with respect to 100 parts by weight of the base resin may be further included and introduced to the first raw material feeding vessel.

In the embodiment of the present invention, at least any one of greater than 0 parts by weight to less than or equal to 70 parts by weight of barium sulfate, greater than 0 parts by weight and less than or equal to 40 parts by weight of talc, greater than 0 parts by weight and less than or equal to 25 parts by weight of ferrite, and greater than 0 parts by weight and less than or equal to 25 parts by weight of wollastonite, with respect to 100 parts by weight of the base resin may be further included and introduced to the second raw material feeding vessel in the second feeding process.

In the embodiment of the present invention, the extrusion molding step may coat the liquid composite resin composition extruded from the biaxial extruder on a prepared carpet fabric material, and dry the result to form a sound insulation material coated on the carpet fabric material.

A sound insulation material according to one embodiment of the present invention further includes 30 parts by weight to 70 parts by weight of aluminum oxide, 10 parts by weight to 20 parts by weight of nanoclay, 0.2 parts by weight to 0.8 parts by weight of an antioxidant and 0.1 parts by weight to 0.5 parts by weight of a lubricant, with respect to 100 parts by weight of a base resin including PE.

In the embodiment of the present invention, 100 parts by weight of the base resin may include 60 parts by weight to 80 parts by weight of LDPE and 20 parts by weight to 40 parts by weight of rubber.

The sound insulation material according to one embodiment of the present invention may further include 4 parts by weight to 6 parts by weight of a high flowing modifier with respect to 100 parts by weight of the base resin.

The sound insulation material according to one embodiment of the present invention may further include greater than 0 parts by weight to less than or equal to 70 parts by weight of barium sulfate with respect to 100 parts by weight of the base resin including PE.

The sound insulation material according to one embodiment of the present invention may further include greater than 0 parts by weight and less than or equal to 40 parts by weight of talc with respect to 100 parts by weight of the base resin including PE.

The sound insulation material according to one embodiment of the present invention may further include greater than 0 parts by weight and less than or equal to 25 parts by weight of ferrite with respect to 100 parts by weight of the base resin including PE.

The sound insulation material according to one embodiment of the present invention may further include greater than 0 parts by weight and less than or equal to 25 parts by weight of wollastonite with respect to 100 parts by weight of the base resin including PE.

The sound insulation material according to one embodiment of the present invention may further include 1 part by weight to 3 parts by weight of a pigment with respect to 100 parts by weight of the base resin.

The sound insulation material according to one embodiment of the present invention has specific gravity of 1.4 to 1.50, a melt index of 10 or greater, tensile strength of 80 kgf/cm$^2$ or greater according to the ASTM D790, and transmission loss (TL) of 16 dB or greater with a pipe method according to the ASTM E1050.

A carpet for a vehicle according to one embodiment of the present invention includes a base flooring material, a sound insulation material laminated on the base flooring material, and a carpet fabric material laminated on the sound insulation material, and the sound insulation material further includes 30 parts by weight to 70 parts by weight of aluminum oxide, 10 parts by weight to 20 parts by weight of nanoclay, 0.2 parts by weight to 0.8 parts by weight of an antioxidant, and 0.1 parts by weight to 0.5 parts by weight of a lubricant, with respect to 100 parts by weight of a base resin including PE.

In the sound insulation material of the present invention, 100 parts by weight of the base resin may include 60 parts by weight to 80 parts by weight of LDPE and 20 parts by weight to 40 parts by weight of rubber.

In the embodiment of the present invention, the sound insulation material may further include 4 parts by weight to 6 parts by weight of a high flowing modifier with respect to 100 parts by weight of the base resin.

In the embodiment of the present invention, the sound insulation material may further include greater than 0 parts by weight to less than or equal to 70 parts by weight of barium sulfate with respect to 100 parts by weight of the base resin including PE.

In the embodiment of the present invention, the sound insulation material may further include greater than 0 parts by weight to less than or equal to 40 parts by weight of talc with respect to 100 parts by weight of the base resin including PE.

In the embodiment of the present invention, the sound insulation material may further include greater than 0 parts by weight to less than or equal to 25 parts by weight of ferrite with respect to 100 parts by weight of the base resin including PE.

In the embodiment of the present invention, the sound insulation material may further include greater than 0 parts by weight to less than or equal to 25 parts by weight of wollastonite with respect to 100 parts by weight of the base resin including PE.

In the embodiment of the present invention, the sound insulation material may further include 1 part by weight to 3 parts by weight of a pigment with respect to 100 parts by weight of the base resin.

In the embodiment of the present invention, the sound insulation material has specific gravity of 1.4 to 1.50, a melt index of 10 or greater, tensile strength of 80 kgf/cm$^2$ or greater according to the ASTM D790, and transmission loss (TL) of 16 dB or greater with a pipe method according to the ASTM E1050.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
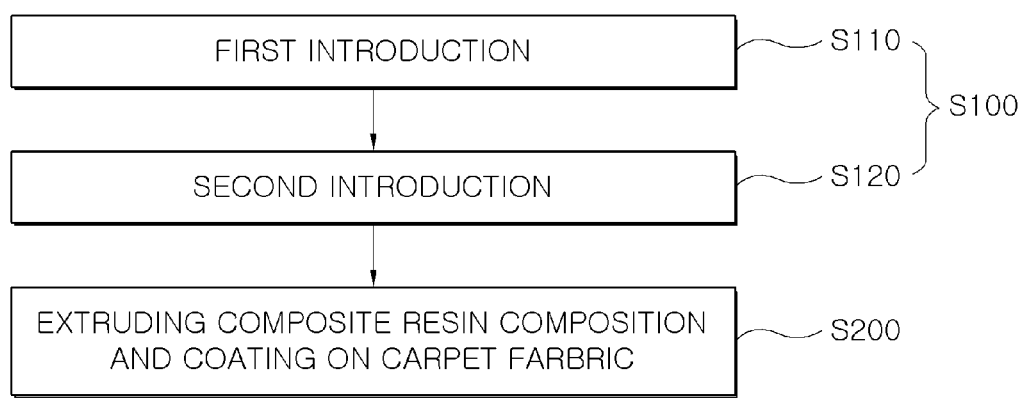
FIG. 1 is a process chart illustrating one embodiment of a method for manufacturing a sound insulation material according to the present invention.

The present invention will be described in detail with reference to the accompanying drawings. Herein, repeated descriptions, detailed descriptions on known functions and constitutions that may unnecessarily evade the gist of the present invention are not included. Embodiments of the present invention are provided for more completely describing the present invention to those having average knowledge in the art. Accordingly, shapes, sizes and the like of components illustrated in the drawings may be exaggerated for convenience of description and clarity.

FIG. 1 is a process chart illustrating one embodiment of a method for manufacturing a sound insulation material, and when referring to FIG. 1, a method for manufacturing a sound insulation material according to one embodiment of the present invention includes a resin composition preparation step (S100) preparing a composite resin composition further including 30 parts by weight to 70 parts by weight of aluminum oxide, 10 parts by weight to 20 parts by weight of nanoclay, 0.2 parts by weight to 0.8 parts by weight of an antioxidant, and 0.1 parts by weight to 0.5 parts by weight of a lubricant, with respect to 100 parts by weight of a base resin including PE, and an extrusion molding step (S200) extrusion molding the composite resin composition prepared in the resin composition preparation step (S100).

One example of 100 parts by weight of the base resin is a mixture of 60 parts by weight to 80 parts by weight of LDPE and 20 parts by weight to 40 parts by weight of rubber.

The rubber is used for enhancing moldability in the extrusion molding.

The resin composition preparation step (S100) preferably further includes 4 parts by weight to 6 parts by weight of a high flowing modifier with respect to 100 parts by weight of the base resin including PE in preparing the composite resin composition.

The high flowing modifier is used for enhancing coatability during the extrusion molding by increasing melting flowability, that is, for smoothly forming a coating layer to a uniform thickness with binding strength when coated on a carpet fabric.

The aluminum oxide is a high specific gravity filler and is included for enhancing sound insulation performance.

The nanoclay is a high specific gravity and plate-type filler, and is included for enhancing sound insulation performance.

The resin composition preparation step (S100) preferably further includes greater than 0 parts by weight to less than or equal to 70 parts by weight of barium sulfate with respect to 100 parts by weight of the base resin including PE in preparing the composite resin composition.

The barium sulfate is a high specific gravity filler and is included for enhancing sound insulation performance.

In addition, the resin composition preparation step (S100) preferably further includes greater than 0 parts by weight to less than or equal to 40 parts by weight of talc with respect to 100 parts by weight of the base resin including PE in preparing the composite resin composition.

The talc is a high specific gravity filler and is included for enhancing sound insulation performance.

The resin composition preparation step (S100) preferably further includes greater than 0 parts by weight to less than or equal to 25 parts by weight of ferrite with respect to 100 parts by weight of the base resin including PE in preparing the composite resin composition.

The ferrite is a high specific gravity filler and is included for enhancing sound insulation performance.

In addition, the resin composition preparation step (S100) preferably further includes greater than 0 parts by weight to less than or equal to 25 parts by weight of wollastonite with respect to 100 parts by weight of the base resin including PE in preparing the composite resin composition.

The wollastonite is high specific gravity filler and is included for enhancing sound insulation performance.

In addition, the resin composition preparation step (S100) may further include 1 part by weight to 3 parts by weight of a pigment with respect to 100 parts by weight of the base resin including PE in preparing the composite resin composition. The pigment is added for obtaining color of the sound insulation material, and one example thereof includes carbon black.

The resin composition preparation step (S100) may include a first feeding process (S110) introducing 0.2 parts by weight to 0.8 parts by weight of an antioxidant and 0.1 parts by weight to 0.5 parts by weight of a lubricant in addition to 100 parts by weight of the base resin, that is, 60 parts by weight to 80 parts by weight of LDPE and 20 parts by weight to 40 parts by weight of rubber, to a first raw material feeding vessel on a fore-end side of a biaxial extruder heated to 150° C. to 240° C., and a second feeding process (S120) introducing 30 parts by weight to 70 parts by weight of aluminum oxide and 10 parts by weight to 20 parts by weight of nanoclay with respect to 100 parts by weight of the base resin to a second raw material feeding vessel located at the middle of the biaxial extruder after the first feeding process (S110).

In the first feeding process (S110), at least any one of 4 parts by weight to 6 parts by weight of a high flowing modifier and 1 part by weight to 3 parts by weight of a pigment with respect to 100 parts by weight of the base resin may be further included and introduced to the first raw material feeding vessel.

In the second feeding process (S120), at least any one of greater than 0 parts by weight to less than or equal to 70 parts by weight of barium sulfate, greater than 0 parts by weight to less than or equal to 40 parts by weight of talc, greater than 0 parts by weight to less than or equal to 25 parts by weight of ferrite, and greater than 0 parts by weight to less than or equal to 25 parts by weight of wollastonite, with respect to 100 parts by weight of the base resin may be further included and introduced to the second raw material feeding vessel.

This is for enhancing preparation efficiency of the composite resin composition by efficiently introducing a number of compositions.

The resin composition preparation step (S100) prepares the composite resin composition through a heat melting mixing process with a number of compositions introduced through the first feeding process (S110) and the second feeding process (S120), and more detailed descriptions on the heat melting mixing process will not be included since the process is a known technology.

The extrusion molding step (S200) prepares a sound insulation material having a thickness in the range previously set by extruding the composite resin composition.

In addition, the extrusion molding step (S200) may coat the liquid composite resin composition extruded from the biaxial extruder on a prepared carpet fabric material, and dry the result to form a sound insulation material coated on the carpet fabric material.

The carpet fabric material includes a polymer layer and a skin layer, and one example of the polymer layer includes latex, and one example of the skin layer includes non-woven fabric or bulked continuous fiber (BCF).

The carpet fabric will be described in more detail in the following descriptions on embodiments of a carpet for a vehicle according to the present invention.

A sound insulation material according to one embodiment of the present invention further includes 30 parts by weight to 70 parts by weight of aluminum oxide, 10 parts by weight to 20 parts by weight of nanoclay, 0.2 parts by weight to 0.8 parts by weight of an antioxidant, and 0.1 parts by weight to 0.5 parts by weight of a lubricant, with respect to 100 parts by weight of a base resin including PE.

One example of 100 parts by weight of the base resin includes 60 parts by weight to 80 parts by weight of LDPE and 20 parts by weight to 40 parts by weight of rubber.

The sound insulation material according to one embodiment of the present invention may further include 4 parts by weight to 6 parts by weight of a high flowing modifier with respect to 100 parts by weight of the base resin.

The sound insulation material according to one embodiment of the present invention may further include greater than 0 parts by weight to less than or equal to 70 parts by weight of barium sulfate with respect to 100 parts by weight of the base resin including PE.

The barium sulfate is a high specific gravity filler and is included for enhancing sound insulation performance.

The sound insulation material according to one embodiment of the present invention may further include greater than 0 parts by weight to less than or equal to 40 parts by weight of talc with respect to 100 parts by weight of the base resin including PE.

The talc is a high specific gravity filler and is included for enhancing sound insulation performance.

The sound insulation material according to one embodiment of the present invention may further include greater than 0 parts by weight to less than or equal to 25 parts by weight of ferrite with respect to 100 parts by weight of the base resin including PE.

The ferrite is a high specific gravity filler and is included for enhancing sound insulation performance.

The sound insulation material according to one embodiment of the present invention may further include greater than 0 parts by weight to less than or equal to 25 parts by weight of wollastonite with respect to 100 parts by weight of the base resin including PE.

The wollastonite is a high specific gravity filler and is included for enhancing sound insulation performance.

The sound insulation material according to one embodiment of the present invention may further include 1 part by weight to 3 parts by weight of a pigment with respect to 100 parts by weight of the base resin including PE. The pigment is added for obtaining color of the sound insulation material, and one example thereof includes carbon black.

The sound insulation material according to one embodiment of the present invention has specific gravity of 1.4 to 1.50, a melt index of 10 or greater, tensile strength of 80 kgf/cm$^2$ or greater according to the ASTM D790, and transmission loss (TL) of 16 dB or greater with a pipe method according to the ASTM E1050.

The following Table 1 shows composition ratios for sound insulation materials according to the present invention, and Table 2 shows composition ratios for sound insulation materials of comparative examples, and the following composition ratios are weight ratios of each composition for 100 parts by weight of the base resin forming 100 parts by weight by including 70 parts by weight of LDPE and 30 parts by weight of rubber, 100 parts by weight of a base resin formed only with LDPE, or 100 parts by weight of a base resin formed only with rubber.

In Example 1 to Example 4 and Comparative Example 1 to Comparative Example 12 of the following Table 1 and Table 2, a composite resin composition was prepared by introducing the first feeding process (S110) and the second feeding process (S120) in the following compositions in a known biaxial extruder (L/D=40, φ=27 mm) heated to 180° C., and then through a heat melting mixing process, and the composite resin composition was prepared to a pellet shape by extruding the result to a thickness of 3 t, and then drying the result in a dryer for 12 hours using hot air of 70° C.

In addition, the pellet-shaped composite resin composition was molded to a specimen using a 70 ton press for application evaluations such as physical property measurements at 200° C. and sound insulation performance (TL). The specimen was left unattended for 48 hours at 23° C. and relative humidity of 50%, and specific gravity, a melt index, tensile strength according to the ASTM D790, transmission loss (TL) with a pipe method according to the ASTM E1050, and favorableness for moldability were determined to identify the physical property evaluation test results for the sound insulation material according to the present invention through Example 1 to Example 4 and Comparative Example 1 to Comparative Example 12 as shown in the following Table 1 and the following Table 2.

TABLE 1

|  | Example 1 | Example 2 | Example 3 | Example 4 |
| --- | --- | --- | --- | --- |
| LDPE | 70 | 70 | 70 | 70 |
| Rubber | 30 | 30 | 30 | 30 |
| High Flowing Modifier | 5 | 5 | 5 | 5 |
| Barium Sulfate | 30 | 30 | 30 | 30 |
| Aluminum Oxide | 50 | 65 | 60 | 50 |
| Talc |  |  |  |  |
| Ferrite |  |  |  |  |
| Nanoclay | 15 | 15 | 20 | 20 |
| Wollastonite | 5 | 5 | 5 | 5 |
| Carbon Black | 2 | 2 | 2 | 2 |
| Antioxidant | 0.5 | 0.5 | 0.5 | 0.5 |
| Lubricant | 0.3 | 0.3 | 0.3 | 0.3 |
| Specific Gravity | 1.45 | 1.45 | 1.45 | 1.46 |
| Tensile Strength | 84 | 83 | 83 | 86 |
| M.I | 12 | 12 | 13 | 12 |
| TL | 22 | 21 | 24 | 23 |
| Moldability (0.3 t) | Favorable | Favorable | Favorable | Favorable |

TABLE 2

| | Comparative Example 1 | Comparative Example 2 | Comparative Example 3 | Comparative Example 4 | Comparative Example 5 | Comparative Example 6 |
|---|---|---|---|---|---|---|
| LDPE | 70 | 70 | 70 | 70 | 100 | |
| Rubber | 30 | 30 | 30 | 30 | | 100 |
| High Flowing Modifier | 5 | 5 | 5 | 5 | 5 | 5 |
| Barium Sulfate | 30 | | | 15 | 30 | 30 |
| Aluminum Oxide | 65 | 65 | 65 | 65 | 65 | 65 |
| Talc | | 30 | | 15 | | |
| Ferrite | | | 25 | | | |
| Nanoclay | | | | | | |
| Wollastonite | 5 | 5 | 5 | 5 | 5 | 5 |
| Carbon Black | 2 | 2 | 2 | 2 | 2 | 2 |
| Antioxidant | 0.5 | 0.5 | 0.5 | 0.5 | 0.5 | 0.5 |
| Lubricant | 0.3 | 0.3 | 0.3 | 0.3 | 0.3 | 0.3 |
| Specific Gravity | 1.45 | 1.44 | 1.48 | 1.44 | 1.45 | 1.45 |
| Tensile Strength | 88 | 91 | 86 | 85 | 95 | 55 |
| M.I | 12 | 10 | 14 | 12 | 8 | 12 |
| TL | 16 | 15 | 15 | 16 | 16 | 11 |
| Moldability (0.3 t) | Favorable | Favorable | Favorable | Favorable | Poor | Favorable |

| | Comparative Example 7 | Comparative Example 8 | Comparative Example 9 | Comparative Example 10 | Comparative Example 11 | Comparative Example 12 |
|---|---|---|---|---|---|---|
| LDPE | 70 | 70 | 70 | 70 | 70 | 70 |
| Rubber | 30 | 30 | 30 | 30 | 30 | 30 |
| High Flowing Modifier | | 5 | 5 | 5 | 5 | 5 |
| Barium Sulfate | 30 | | | 80 | 15 | 40 |
| Aluminum Oxide | 65 | 66 | 48 | | 60 | 75 |
| Talc | | 26 | 12 | | | |
| Ferrite | | | | | | |
| Nanoclay | | 3 | 35 | 15 | | |
| Wollastonite | 5 | 5 | 5 | 5 | 5 | 5 |
| Carbon Black | 2 | 2 | 2 | 2 | 2 | 2 |
| Antioxidant | 0.5 | 0.5 | 0.5 | 0.5 | 0.5 | 0.5 |
| Lubricant | 0.3 | 0.3 | 0.3 | 0.3 | 0.3 | 0.3 |
| Specific Gravity | 1.46 | 1.45 | 1.45 | 1.45 | 1.35 | 1.55 |
| Tensile Strength | 113 | 88 | 68 | 91 | 98 | 65 |
| M.I | 3 | 11 | 12 | 12 | 12 | 13 |
| TL | 15 | 15 | 25 | 14 | 11 | 20 |
| Moldability (0.3 t) | Poor | Favorable | Poor | Favorable | Favorable | Poor |

When referring to Table 1 and Table 2, rubber was added to LDPE, a base resin, for moldability, and when using 100 parts by weight of LDPE only as in Comparative Example 5, flowability is low leading to low moldability, and when using 100 parts by weight of rubber only as in Comparative Example 6, tensile strength was 55 kgf/cm², which is below 80 kgf/cm², a target value. Accordingly, in the sound insulation material according to the present invention, LDPE and rubber were mixed in a weight ratio of 70:30 to be used as the base resin. In addition, when the high flowing modifier was not used, flowability was approximately 3, which is very unfavorable, as identified in Comparative Example 7, and as one example, the high flowing modifier was used in 5 parts by weight as an additive.

The nanoclay was used for providing sound insulation performance, and when included in 3 parts by weight with respect to 100 parts by weight of the base resin as in Comparative Example 8, transmission loss (TL) was approximately 15, when included in 15 parts by weight with respect to 100 parts by weight of the base resin as in Example 1, Example 2 and Comparative Example 10 of the present invention, transmission loss (TL) was approximately from 14 to 22, when included in 20 parts by weight with respect to 100 parts by weight of the base resin as in Example 3 and Example 4, transmission loss (TL) was approximately from 23 to 24, and when included in 35 parts by weight with respect to 100 parts by weight of the base resin as in Comparative Example 9, transmission loss (TL) was approximately 25, and it was identified that transmission loss was enhanced as the content increased. However, when the nanoclay content increases, a problem occurs in the moldability whereas sound insulation performance becomes favorable, and therefore, the nanoclay is preferably included in 10 parts by weight to 20 parts by weight with respect to 100 parts by weight of the base resin.

In addition, when comparing with the content of barium sulfate and aluminum oxide when the nanoclay is included in 15 parts by weight with respect to 100 parts by weight of the base resin, sound insulation performance increased from 14 to 22 when barium sulfate:aluminum oxide was 30:50 compared to barium sulfate:aluminum oxide being 80:0, and therefore, it is identified that an effect of enhancing sound insulation performance greatly increases when the nanoclay is used together with aluminum oxide.

The barium sulfate was used for providing sound insulation performance, and when the barium sulfate content was 0 as in Comparative Example 2, Comparative Example 3, Comparative Example 8 and Comparative Example 9, that is, when the barium sulfate was not included in the composition of the sound insulation material, transmission loss (TL) was approximately 15, and when included in 15 parts by weight with respect to 100 parts by weight of the base resin as in Comparative Example 4 and Comparative Example 11, transmission loss (TL) was approximately from 11 to 16, when included in 30 parts by weight with respect to 100 parts by weight of the base resin as in Comparative Example 1 and Comparative Example 5 to Comparative Example 7 and Example 1 to Example 4 of the present invention, transmission loss (TL) was approximately from 16 to 24, and when included in 80 parts by weight with respect to 100 parts by weight of the base resin as in Comparative Example 10, transmission loss (TL) was approximately 14. Considering the target of transmission loss (TL) value of 16 dB or greater, the barium sulfate content in the present invention is preferably from 15 parts by weight to 30 parts by weight with respect to 100 parts by weight of the base resin.

In addition, the aluminum oxide was used for providing sound insulation performance, and when included in 50 parts by weight with respect to 100 parts by weight of the base resin as in Example 1 and Example 4 of the present invention, transmission loss (TL) was approximately from 22 to 23, when included in 65 parts by weight with respect to 100 parts by weight of the base resin as in Example 2 and Comparative Example 1 to Comparative Example 7, transmission loss (TL) was approximately from 15 to 21, when included in 66 parts by weight with respect to 100 parts by weight of the base resin as in Comparative Example 8, transmission loss (TL) was approximately 15, and when included in 75 parts by weight with respect to 100 parts by weight of the base resin as in Comparative Example 12, transmission loss (TL) was approximately 20. Considering the target of transmission loss (TL) value of 16 dB or greater, the aluminum oxide content in the present invention is preferably from 50 parts by weight to 75 parts by weight with respect to 100 parts by weight of the base resin.

The talc was used for providing sound insulation performance, and when included in 15 parts by weight with respect to 100 parts by weight of the base resin as in Comparative Example 4, transmission loss (TL) was approximately 16, when included in 26 parts by weight with respect to 100 parts by weight of the base resin as in Comparative Example 8, transmission loss (TL) was approximately 15, and when included in 30 parts by weight with respect to 100 parts by weight of the base resin as in Comparative Example 2, transmission loss (TL) was approximately 15, and therefore, the talc content in the present invention is preferably greater than 0 parts by weight and less than or equal to 40 parts by weight with respect to 100 parts by weight of the base resin.

The ferrite was used for providing sound insulation performance, and when included in 25 parts by weight with respect to 100 parts by weight of the base resin as in Comparative Example 3, transmission loss (TL) was 15, and therefore, the ferrite content in the embodiment of the present invention is preferably greater than 0 parts by weight and less than or equal to 25 parts by weight with respect to 100 parts by weight of the base resin.

Figure 2:
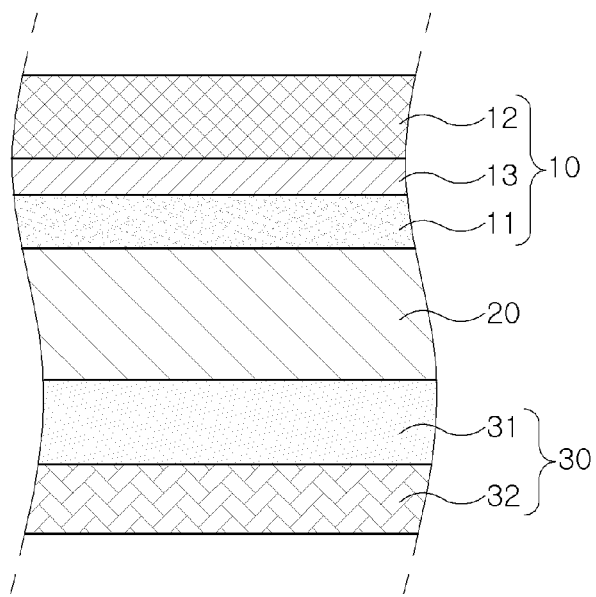
FIG. 2 is a sectional view illustrating one embodiment of a carpet for a vehicle according to the present invention.
Figure 3:
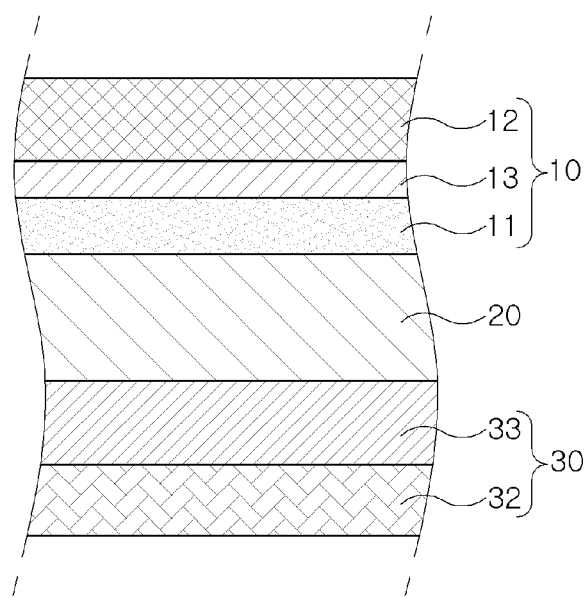
FIG. 3 is a sectional view illustrating another embodiment of a carpet for a vehicle according to the present invention.

FIG. 2 is a sectional view illustrating one embodiment of a carpet for a vehicle according to the present invention using the sound insulation material according to the present invention, and FIG. 3 is a sectional view illustrating another embodiment of a carpet for a vehicle according to the present invention. When referring to FIG. 2 and FIG. 3, a carpet for a vehicle according to one embodiment of the present invention includes a sound insulation material (20), and a carpet fabric material (10) laminated on the sound insulation material (20), and the sound insulation material (20) includes 30 parts by weight to 70 parts by weight of aluminum oxide, 10 parts by weight to 20 parts by weight of nanoclay, 0.2 parts by weight to 0.8 parts by weight of an antioxidant, and 0.1 parts by weight to 0.5 parts by weight of a lubricant, with respect to 100 parts by weight of a base resin including PE.

Embodiments on the sound insulation material (20) are the same as the sound insulation material (20) according to one embodiment of the present invention described above, and descriptions thereon will not be repeated.

The carpet fabric material (10) includes a polymer layer (11) and a skin layer (12), and one example of the polymer layer (11) includes latex, and one example of the skin layer (12) includes non-woven fabric or bulked continuous fiber (BCF).

The carpet fabric material (10) may insert a backing cloth (13) between the polymer layer (11) and the skin layer (12) for enhancing adhesive strength of the skin layer (12). The backing cloth (13) is a low density fiber and enhances binding strength between the polymer layer (11) and the skin layer (12) to prevent peel-off of the skin layer (12).

The backing cloth (13) is a known material and may be diversely modified, and therefore, more detailed descriptions thereon will not be included.

In addition, the carpet for a vehicle according to the present invention may further include a base flooring material (30) attached to a lower surface of the sound insulation material (20).

When referring to FIG. 2, the base flooring material (30) may include a high stiffness felt material (31) attached to a lower surface of the sound insulation material (20), and a PU foam material (32) attached to a lower surface of the high stiffness felt material (31).

In addition, when referring to FIG. 3, the base flooring material (30) may include a backing cloth (33) attached to a lower surface of the sound insulation material (20), and a PU foam material (32) attached to a lower surface of the backing cloth (33).

The backing cloth (33) is a low density fiber enabling the PU foam material (32) to be firmly attached to a lower surface of the sound insulation material (20), and enhances binding strength between the sound insulation material (20) and the PU foam material (32) to prevent peel-off of the PU foam material (32).

One example of the base flooring material (30) includes another sound insulation material (20) attached to a lower surface of a sound insulation material (20) in an existing carpet for a vehicle, and the base flooring material (30) may be diversely modified using known materials.

Figure 4:
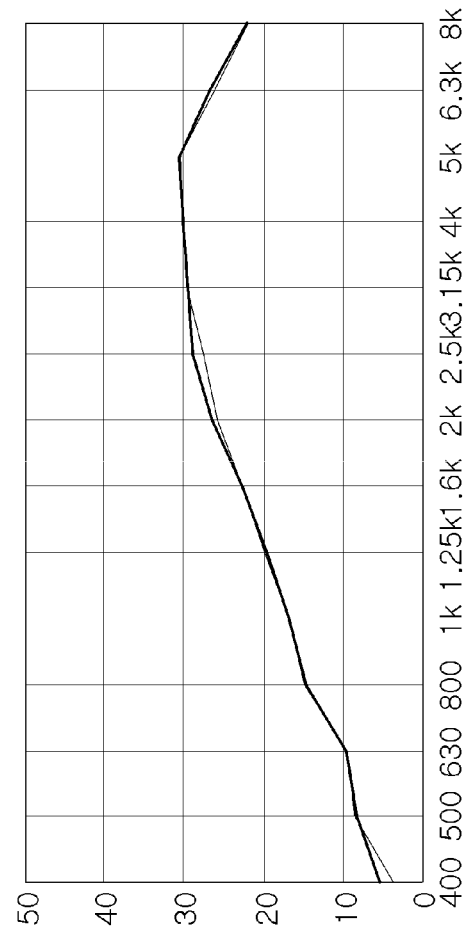
FIG. 4 and FIG. 5 are graphs comparing noise and vibration performance for examples of a carpet for a vehicle according to the present invention and existing specifications used.
Figure 5:
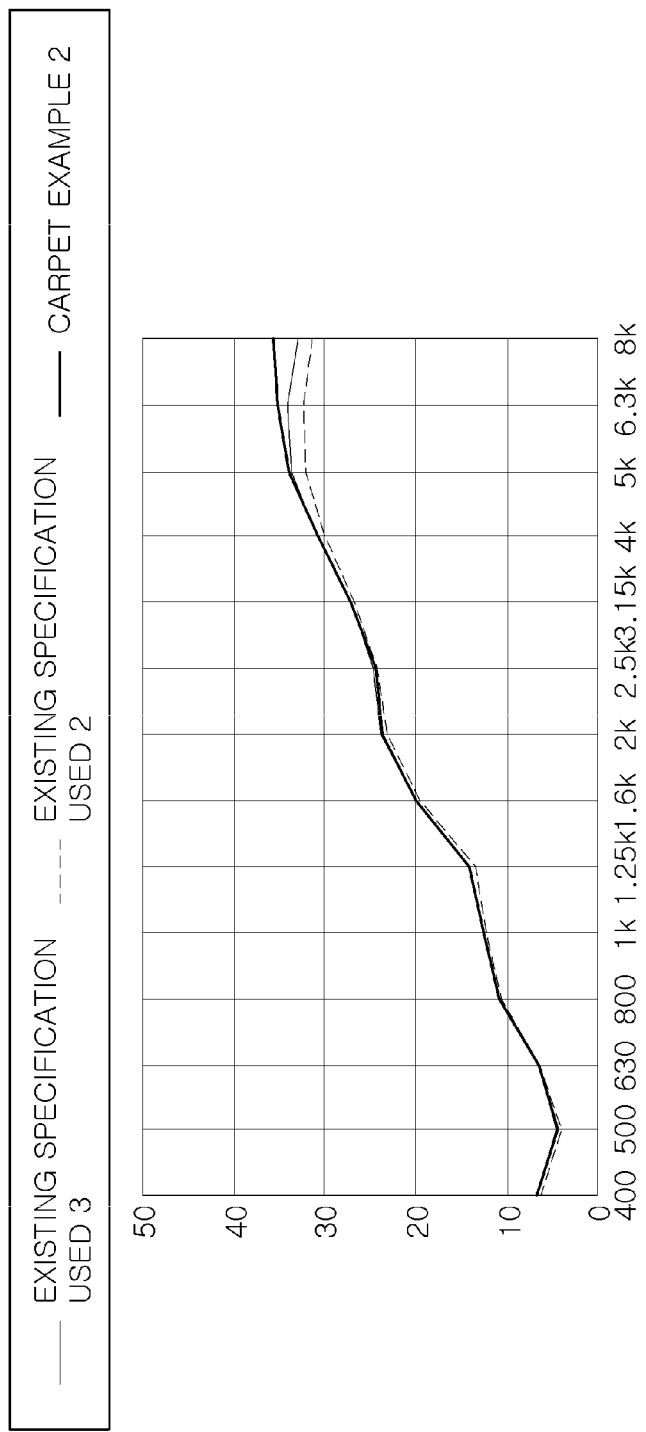

FIG. 4 and FIG. 5 are graphs comparing noise and vibration performance for examples of a carpet for a vehicle according to the present invention and existing specifications used. Herein, x axes of the graphs mean frequency (Hz), and Y axes mean transmission loss (dB).

Existing specification used 1 of FIG. 4 is an existing carpet for a vehicle, and an example thereof includes, as the carpet fabric material, 700 g of non-woven fabric as a skin layer and 100 g of latex as a polymer layer, and includes 250 g of a PE layer and 500 g of an AP layer as a sound insulation material and includes 20 g of a backing cloth at the bottom of the AP layer.

In addition, carpet Example 1 of FIG. 4 is a carpet for a vehicle according to the present invention using 500 g of the sound insulation material of Example 1 (Table 1), and an example thereof includes, as the carpet fabric material, 700 g of non-woven fabric as a skin layer and 100 g of latex as a polymer layer, and includes 500 g of the sound insulation material of Example 1 (Table 1) and includes 20 g of a backing cloth at the bottom of the sound insulation material.

As seen from FIG. 4, it can be identified that the carpet for a vehicle using the sound insulation material according to the present invention has the same effect in the noise and vibration performance while having a smaller weight compared to an existing carpet for a vehicle using a sound insulation material formed with a PE layer and an AP layer.

Existing specification used 2 of FIG. 5 is an existing carpet for a vehicle, and an example thereof includes, as the carpet fabric material, 700 g of non-woven fabric as a skin layer and 100 g of latex as a polymer layer, and includes 250 g of a PE layer and 700 g of an AP layer as a sound insulation material and includes 20 g of a backing cloth at the bottom of the AP layer.

Existing specification used 3 of FIG. 5 is an existing carpet for a vehicle, and an example thereof includes, as the carpet fabric material, 700 g of non-woven fabric as a skin layer and 100 g of latex as a polymer layer, and includes 250 g of a PE layer and 700 g of an EVA layer as a sound insulation material and includes 20 g of a backing cloth at the bottom of the EVA layer.

In addition, carpet Example 2 of FIG. 5 is a carpet for a vehicle according to the present invention using 700 g of the sound insulation material of Example 1 (Table 1), and an example thereof includes, as the carpet fabric material, 700 g of non-woven fabric as a skin layer and 100 g of latex as a polymer layer, and includes 700 g of the sound insulation material of Example 1 (Table 1) and includes 20 g of a backing cloth at the bottom of the sound insulation material.

As seen from FIG. 5, it can be identified that the carpet for a vehicle using the sound insulation material according to the present invention has the same effect in the noise and vibration performance while having a smaller weight compared to an existing carpet for a vehicle using a sound insulation material formed with a PE layer and an EVA layer as well as an existing carpet for a vehicle using a sound insulation material formed with a PE layer and an AP layer.

As a reference, the carpet for a vehicle using the sound insulation material according to the present invention was identified to satisfy all MS SPEC verification tests as shown in the following Table 3.

MS SPEC verification test items and test methods, criteria, test results on the carpet for a vehicle using the sound insulation material according to the present invention are as shown in the following Table 3.

TABLE 3

| Item | SPEC | Test Method | Criterion | Test Result |
| --- | --- | --- | --- | --- |
| Heat Resistance Cold Resistance | MS 210-05D | Heat Resistance 80° C. ± 2° C. Cold Resistance −40° C. ± 2° C. Moisture Resistance 50 ± 2° C., 90% RH or Higher | No visible changes such as distortion, deformation, discoloration, balance, cracks, peel-off, hardness and stickiness | OK (No Deformation) |
| Combustibility | MS 300-08 | Left Unattended at High Temperature 80° C. × 168 hr Status 16° C. to 26° C., 55 ± 5% | No combustion at 80 mm/min or less, or 50 mm or greater from measuring point, and needs to be out within 60 seconds | OK (43 mm) |
| Durability | MS 343-05 | Abrasion Wheel: H-18 Load: Both Sides 2 Kg with 1 Kg at Each Side Number of Abrasion: 300 times (TYPE-C) | Grade 3 or Higher | OK (Grade 3) |
| Odor (VOCs) | MS 300-34 | DRY: Test piece was placed in 4 L desiccator, the result was sealed and heated, test container was taken out and left unattended for 60 minutes at room temperature (23 ± 2° C.) | Grade 3 or Higher | OK (Grade 3) |

The present invention relates to a single layer and low specific gravity sound insulation material, and maintains noise and vibration performance while reducing a weight, simplifies a manufacturing process, and reduces manufacturing costs.

The present invention relates to a carpet for a vehicle using a sound insulation material that is single layer, has low specific gravity and has excellent noise and vibration performance, and enhances noise and vibration performance and fuel efficiency due to a decreased weight.

The present invention reduces manufacturing costs of a carpet for a vehicle, and enhances productivity by simplifying a manufacturing process.

While the present invention has been described with respect to the specific embodiments, it will be apparent to those skilled in the art that various changes and modifications may be made without departing from the spirit and scope of the invention, and the scope of the present invention needs to be interpreted based on the attached claims.

What is claimed is:

1. A method for manufacturing a sound insulation material comprising:
preparing a resin composition, which prepares a composite resin composition further including 50 parts by weight of aluminum oxide, 15 parts by weight of nanoclay, 0.2 parts by weight to 0.8 parts by weight of an antioxidant and 30 parts by weight of barium sulfate, with respect to 100 parts by weight of a base resin including PE; and extrusion molding, which extrusion molds the composite resin composition prepared in the preparing of a resin composition, wherein the nanoclay is plate-type filler.

2. The method for manufacturing a sound insulation material of claim 1, wherein 100 parts by weight of the base resin is a mixture of 60 parts by weight to 80 parts by weight of LDPE and 20 parts by weight to 40 parts by weight of rubber.

3. The method for manufacturing a sound insulation material of claim 1, wherein the preparing of a resin composition further includes 4 parts by weight to 6 parts by weight of a rheology modifier with respect to 100 parts by weight of the base resin including PE to prepare the composite resin composition.

4. The method for manufacturing a sound insulation material of claim 1, wherein the preparing of a resin composition further includes greater than 0 parts by weight to less than or equal to 40 parts by weight of talc with respect to 100 parts by weight of the base resin including PE to prepare the composite resin composition.

5. The method for manufacturing a sound insulation material of claim 1, wherein the preparing of a resin composition further includes greater than 0 parts by weight to less than or equal to 25 parts by weight of wollastonite with respect to 100 parts by weight of the base resin including PE to prepare the composite resin composition.

6. The method for manufacturing a sound insulation material of claim 1, wherein the preparing of a resin composition further includes 1 part by weight to 3 parts by weight of a pigment with respect to 100 parts by weight of the base resin including PE to prepare the composite resin composition.

7. The method for manufacturing a sound insulation material of claim 1, wherein the preparing of a resin composition includes a first feeding process introducing 0.2 parts by weight to 0.8 parts by weight of an antioxidant and 0.1 parts by weight to 0.5 parts by weight of a lubricant in addition to 100 parts by weight of the base resin, that is, 60 parts by weight to 80 parts by weight of LDPE and 20 parts by weight to 40 parts by weight of rubber, to a first raw material feeding vessel on a fore-end side of a biaxial extruder heated to 150° C. to 240° C.; and a second feeding process introducing 50 parts by weight of aluminum oxide and 15 parts by weight of nanoclay with respect to 100 parts by weight of the base resin to a second raw material feeding vessel located at the middle of the biaxial extruder after the first feeding process.

8. The method for manufacturing a sound insulation material of claim 7, wherein, in the first feeding process, at least any one of 4 parts by weight to 6 parts by weight of a rheology modifier and 1 part by weight to 3 parts by weight of a pigment with respect to 100 parts by weight of the base resin is further included and introduced to the first raw material feeding vessel.

9. The method for manufacturing a sound insulation material of claim 8, wherein, in the second feeding process, at least any one of 30 parts by weight of barium sulfate, greater than 0 parts by weight and less than or equal to 40 parts by weight of talc, greater than 0 parts by weight and less than or equal to 25 parts by weight of ferrite, and greater than 0 parts by weight and less than or equal to 25 parts by weight of wollastonite, with respect to 100 parts by weight of the base resin may be further included and introduced to the second raw material feeding vessel.

* * * * *